United States Patent [19]

Theiss et al.

[11] Patent Number: 5,266,779
[45] Date of Patent: Nov. 30, 1993

[54] FAIL SAFE CONTROL DEVICE

[75] Inventors: John J. Theiss, St. Louis, Mo.; Paul T. Durst, Louisville, Ky.

[73] Assignee: Temp. Systems, Inc., St. Louis, Mo.

[21] Appl. No.: 2,921

[22] Filed: Jan. 11, 1993

Related U.S. Application Data

[63] Continuation-in-part of Ser. No. 753,858, Sep. 3, 1991, abandoned.

[51] Int. Cl.$^5$ .............................................. H05B 1/02
[52] U.S. Cl. .................................. 219/513; 236/99 B; 337/309
[58] Field of Search ........................ 219/513, 510, 512; 236/99 B, 99 R; 337/309, 310, 311

[56] References Cited

U.S. PATENT DOCUMENTS 4,691,097  9/1987  Theiss et al. .................... 219/513

Primary Examiner—Harold Broome
Attorney, Agent, or Firm—Edward R. Weber

[57] ABSTRACT

A fail safe temperature control device which consists of a nonelastic container or bulb adapted to be subjected to temperature changes, a capillary tube and a pressure responsive device. The container generally is located in the area in which the heat is to be controlled, typically an oven or other heated area. The capillary tube is connected to the container at a first end and to the pressure responsive device at a second end. The nonelastic container, capillary tube and pressure responsive device form a closed system which is filled with a thermally responsive material. The pressure responsive device operates a control device, typically consisting of a normally closed contact and a normally open contact.

14 Claims, 4 Drawing Sheets

FAIL SAFE CONTROL DEVICE

The present application is a continuation-in-part application under 35 U.S.C. ¢120 of prior application Ser. No. 07/753,858, filed Sept. 3, 1991, now abandoned.

FIELD OF THE INVENTION

This invention relates generally to apparatus wherein a change in temperature is transmitted from a sensing bulb through a capillary to a control device which regulates the application of heat to the area surrounding the sensing bulb. More particularly this invention relates to a novel, fail safe control device for use in conjunction with a temperature sensing bulb, capillary and control device in an oven or other thermal device.

BACKGROUND OF THE INVENTION

Conventional thermostatic control devices used in home ovens and other thermal devices typically have a controller consisting of a bulb located within the heated area, a bellows or other operator located outside the heated area and a capillary connecting the bulb and operator. The entire system, bulb, capillary and operator, is filled with a thermally responsive material so that as the bulb is exposed to heat, the material expands and thus moves the bellows or operator. Temperature control within the oven or heated area is obtained by linking the operator to a switch or valve so that the source of heat is turned off when the operator has moved a predetermined amount. The system works very well as long as the bulb, capillary and bellows or operator remain pressure-tight, so that an increase in volume of the thermally responsive material results in the movement of the bellows or operator. However, occasionally a leak will develop in the system with the result that the thermally responsive material is permitted to leak out. When this occurs, an increase in heat in the area of the bulb does not cause a change in the position of the bellows or operator. In other instances, such as stuck or welded contacts, the source of heat may not be disconnected even though the bellows or operator has moved an amount normally sufficient to disconnect it. In either event, there is no control to interrupt the source of heat and a severe overheat situation may result. In extreme cases, this may cause a fire, or at a minimum, may cause the burning of whatever material is contained in the oven or other heating appliance.

This problem has been addressed in the prior art and in particular, in U.S. Pat. No. 4,691,097. This prior art discloses a second control device attached to the capillary between the temperature sensing bulb and the bellows or operator. This second control device protects against an overheat situation in the event of a loss of the thermally responsive material or in the event the contacts in the control device become stuck or otherwise permanently closed or inoperable. In the first instance, the volume of the thermally responsive material in the second control device is reduced to nothing or at least below a minimum. In the later situation, the volume in the second control device expands beyond a predetermined volume, generally somewhat beyond the normal operating range of the first control device. In either situation, the second control device terminates the heating of the heated area by the operation of switches to open a circuit or the closing of a valve or other control device.

It is therefore an object of this invention to provide a fail safe control device which will prevent an overheat situation when the integrity of the closed system is lost thereby resulting in a loss of the thermally responsive material.

It is another object of the invention to provide a fail safe control device which will prevent either initial heating or a further increase in heating when the closed system of the temperature control device is breached.

A further object of this invention is to provide a fail safe control device which will operate in the event of loss of the thermally responsive material below a predetermined minimum.

It is an additional object of the invention to provide a fail safe control device which utilizes a single pressure responsive control device, bellows or operator.

Other objects and features will be in part apparent and in part pointed out hereinafter.

The invention accordingly comprises the product hereinafter described, the scope of the invention being indicated in the following claims.

SUMMARY OF THE INVENTION

To accomplish the foregoing and other objects of this invention, there is provided a temperature control apparatus utilizing a sensing bulb, a capillary and a control device which will operate safely in the event of a loss of the thermally responsive material contained within the closed system of the temperature control apparatus.

The temperature control device generally consists of a nonelastic container or bulb adapted to be subjected to temperature changes located in the area in which the heat is to be controlled. Typically this will be in an oven or other heating appliance. A capillary tube is connected between the nonelastic container or bulb and a pressure responsive device. As will be understood, the nonelastic container or bulb, capillary tube and pressure responsive device form a closed system which is then filled with a thermally responsive material. The pressure responsive device operates a control device which typically contains a normally closed contact and a normally open contact.

The contacts within the control device are operated by variances in the volume of the thermally responsive material within the pressure responsive device which result from changes in the temperature surrounding the nonelastic container or bulb. The normally closed contact opens at a specific volume which is set to correspond to a predetermined temperature. The opening and closing of the normally closed contact either directly controls the heat source or controls a secondary device which in turn controls the heat source. Such a secondary device can be an electrically, hydraulically, or pneumatically controlled valve which controls the flow of fuel to a burner. Such systems are widely known in the art. The instant invention can be utilized in lieu of conventional bulb-capillary-pressure responsive devices to provide protection against leakage in the system. The normally open contact is held in a closed position by a minimum volume of the thermally responsive material contained within the pressure responsive device. When the volume is decreased below a preselected minimum volume, the normally open contact will open resulting in the temperature control device having an open contact, thereby ensuring safe operation of the oven or other heating appliance.

Optionally, the control device can be provided with a latching mechanism which will prevent the normally open contact from being closed after it has been opened as a result of the loss of thermally responsive material.

BRIEF DESCRIPTION OF THE DRAWINGS

In the instant application.

DETAILED DESCRIPTION OF THE DRAWINGS

Figure 1:
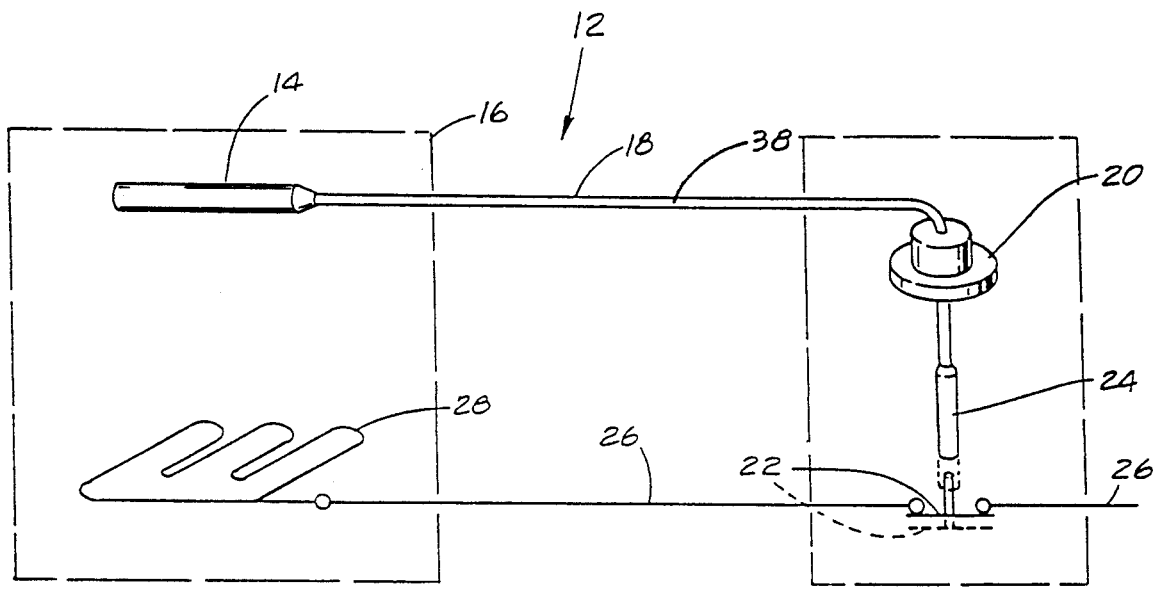
FIG. 1 represents a schematic of a typical control system used to control the temperature of an electrically heated oven.

Referring now to the drawings wherein like reference characters represent like elements, FIG. 1 shows a typical control system 12 used to control the temperature of an electrically heated oven. Temperature sensing bulb 14 is located within oven 16 or other area for which the temperature is to be controlled. Capillary 18 connects temperature sensing bulb 14 with operator 20 which in turn acts upon switch 22 through linkage 24. Switch 22 controls the electrical current flowing through line 26 to heating element 28. During normal operation, operator 20 and linkage 24 are calibrated such that switch 22, normally closed, will open when the temperature surrounding bulb 14 reaches a predetermined temperature. This is accomplished by constructing bulb 14 so that it is essentially nonelastic. In contrast to this, operator 20 is fabricated so that it is substantially elastic and can change in size when the volume of thermally responsive material inside the closed system changes. The entire system 12 consisting of temperature sensing bulb 14, capillary 18 and operator 20 is filled with a thermally responsive material 38 whose volume increases with increases in temperature. Thus an increase in the temperature in the space surrounding bulb 14 will cause thermally responsive material 38 in bulb 14 to increase in volume. Since bulb 14 is essentially nonelastic, the increase in volume is transmitted through nonelastic capillary 18 to operator 20. When a predetermined change in volume has occurred, linkage 24 opens switch 22 cutting off the electrical current to heating element 28. Thus, the periodic cycling of switch 22 will serve to control the temperature of the space containing heating element 28 which surrounds bulb 14.

A leak in either bulb 14, capillary 18 or operator 20 results in the failure of system 12. When a failure such as this occurs, an increase in the temperature surrounding bulb 14 does not result in the opening of switch 22. Heating element 28 is thus permitted to be constantly on and the control function is totally eliminated with occasionally disastrous results.

In a typical control system 12, it is standard practice to specify conditions under which no further contraction of the thermally responsive material will occur as a result of decreases in temperature which results in no further contraction of the material within pressure responsive device 20. As will be understood, this results in no further movement of linkage 24 and the normally closed contact of switch 22 remains in the closed position. This condition is referred to as an "internal stop".

Figure 6:
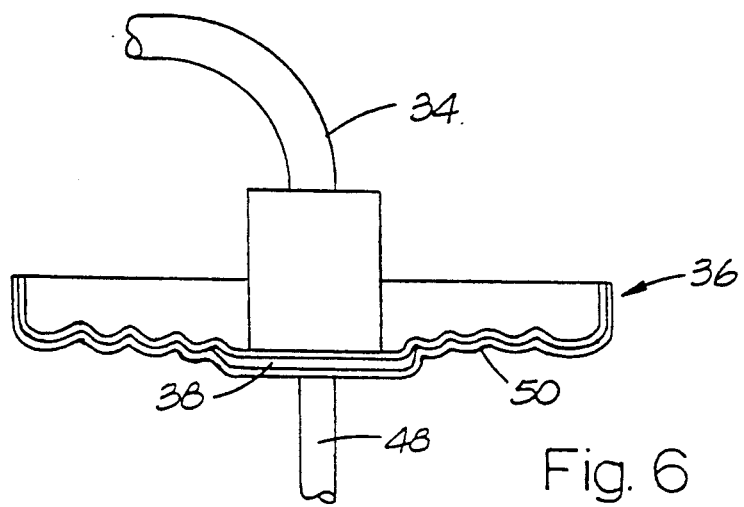
FIG. 6 is an illustration of a pressure responsive device showing a "metal to metal" condition.
Figure 7:
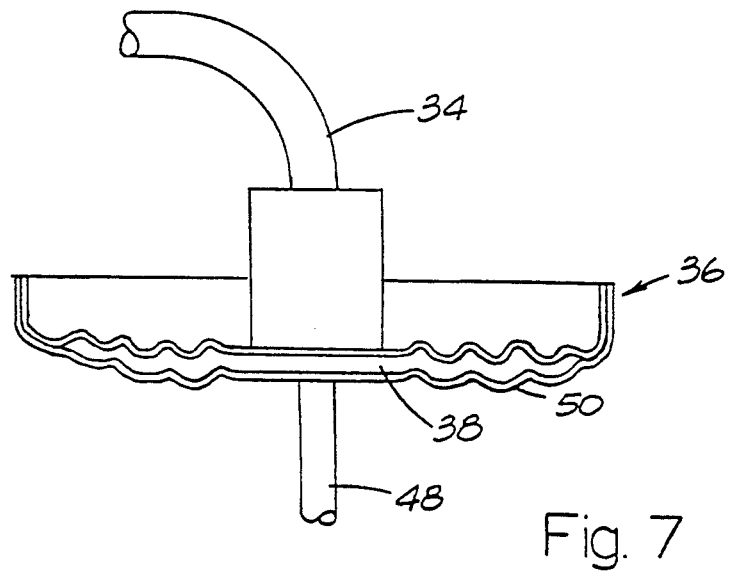
FIG. 7 is an illustration of a pressure responsive device showing expansion due to an increased volume of the thermally responsive material caused by an increase in temperature around the nonelastic container or bulb.

A typical pressure responsive device 20 generally uses a diaphragm 50 which flexes with the expansion and contraction of thermally responsive material 38. The internal stop in such a device can be a "metal to metal" condition, as illustrated in FIG. 6, or it can be an "at rest" condition where diaphragm 50 can no longer flex in response to further contraction of thermally responsive material 38. In a situation where a loss of thermally responsive material 38 occurs, diaphragm 50 goes to this "at rest" condition and normally closed switch 22 remains closed.

Control system 12 is typically calibrated so that movement of diaphragm 50 due to an increase in temperature and the resulting expansion of thermally responsive material 38 must start while opposing a specified load, such as linkage 24 and switch 22, when bulb 14 is exposed to a specified temperature. The coefficient of expansion of thermally responsive material 38 is known so that as the temperature increases, the increase in volume within pressure responsive device 20 can be determined. Diaphragm 50 within pressure responsive device 20 flexes as the volume increases. This flexing in turn moves linkage 24 and operates switch 22. The control system is calibrated so that the contact will open at a specified temperature.

The fail safe control device 10 (FIGS. 2, 3 and 4) of the present invention has been designed to prevent further heating of an oven when a loss of thermally responsive material 38 occurs. Fail safe control device 10 contains an additional amount of thermally responsive material 38 within diaphragm 50. Thus, when no further contraction of thermally responsive material 38 will occur, the additional amount of thermally responsive material 38 prevents diaphragm 50 from moving to the "at rest" position within pressure responsive device 36. The additional amount of thermally responsive material 38 within diaphragm 50 maintains normally open switch 40 in a closed position. In the event that this additional amount of thermally responsive material is lost, normally open switch 40 is opened thus breaking the circuit and rendering the system safe.

Figure 2:
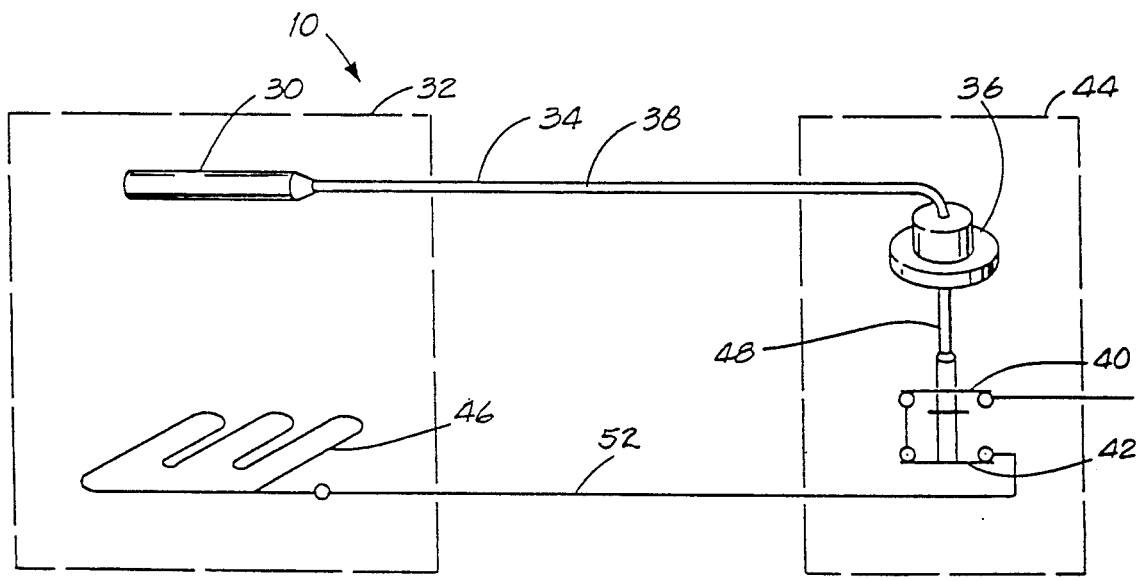
FIG. 2 is a schematic of the fail safe control device of the present invention.

Referring now to FIG. 2, fail safe control device 10 generally consists of the following: a nonelastic bulb 30, a capillary tube 34, and a pressure responsive device 36. Nonelastic bulb 30 is located in the area in which the heat is to be controlled, typically an oven 32 or other heating appliance, and is adapted to be subjected to temperature changes. Capillary tube 34 is connected at a first end to nonelastic bulb 30 and at a second end to pressure responsive device 36. Improved control device 44, consisting of pressure responsive device 36, normally closed contact 42 and normally open contact 40, is operated by changes in volume of thermally responsive material 38 within pressure responsive device 36.

Nonelastic bulb 30, capillary tube 34 and pressure responsive device 36 form a closed system. Thermally responsive material 38, which fills the closed system, is expandable and contractible in response to increases and decreases in temperature. Changes in volume of thermally responsive material 38 act upon the volume within pressure responsive device 36 thereby operating linkage 48, normally open contact 40, and normally closed contact 42.

As in a typical temperature control device, nonelastic bulb 30 is adapted to be subjected to temperature changes. Nonelastic bulb 30 is essentially rigid, thus any changes in volume in thermally responsive material 38 are transmitted to pressure responsive device 36 by nonelastic, capillary tube 34.

Pressure responsive device 36 typically responds to an increase in volume by flexing a diaphragm 50. As the volume within pressure responsive device 36 increases, diaphragm 50 flexes outwardly or convexly. As the volume within pressure responsive device 36 is reduced due to a contraction of thermally responsive material 38, diaphragm 50 relaxes toward the "at rest" condition. The maximum amount of relaxation is defined by the configuration of pressure responsive device 36 and generally occurs when diaphragm 50 is in the "at rest" condition.

Diaphragm 50 is attached to linkage 48 which moves in proportion to the flexing of diaphragm 50. Linkage 48 in turn is connected to normally closed contact 42 and normally open contact 40. As diaphragm 50 flexes, linkage 48 opens and closes normally closed contact 42 of improved control device 44 thereby controlling heating element 46.

Figure 3:
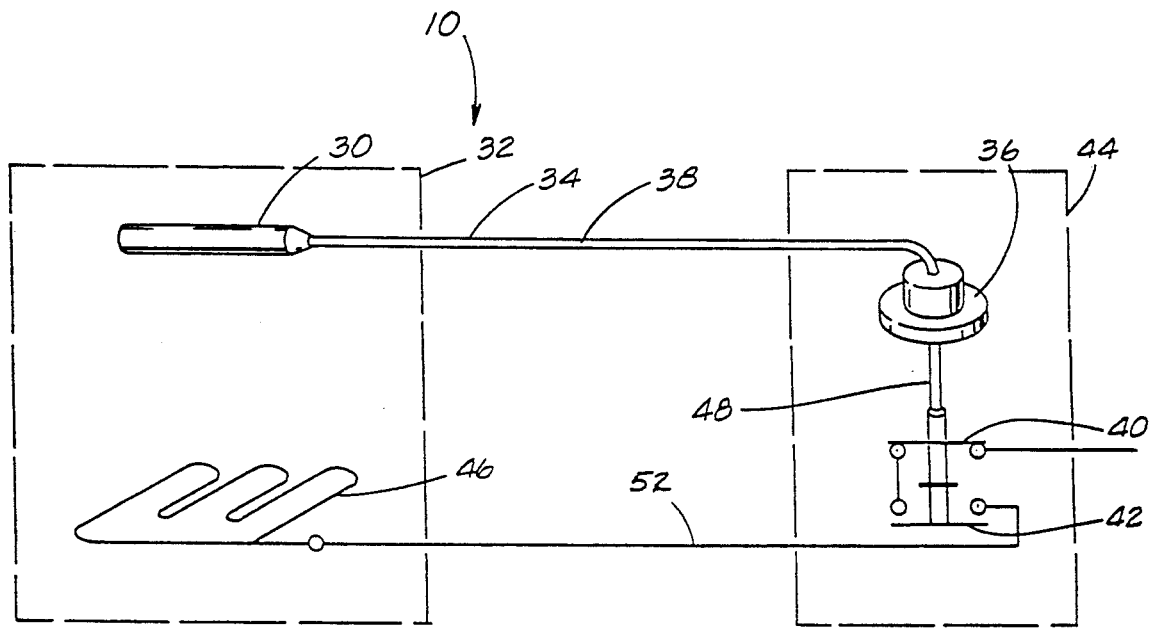
FIG. 3 is a schematic of the fail safe control device of the present invention showing the normally closed switch in an open condition as when the desired temperature in the thermal device has been reached.
Figure 5:
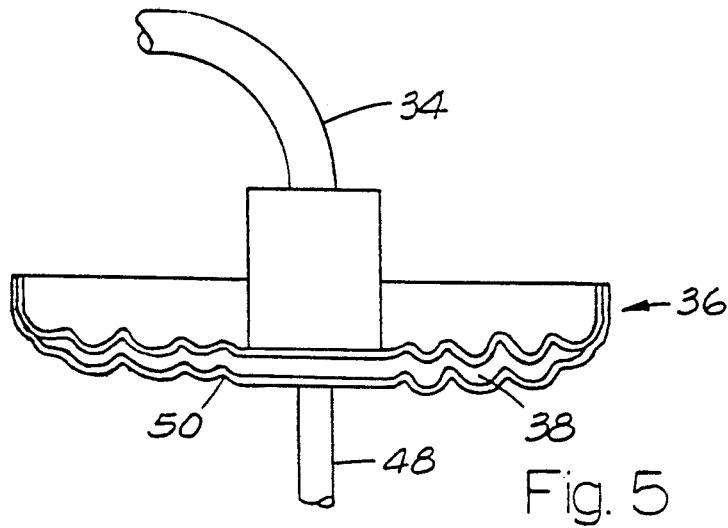
FIG. 5 is an illustration of a pressure responsive device containing a minimum volume of the thermally responsive material.

Referring to FIG. 5, a minimum volume of thermally responsive material 38 is maintained within pressure responsive device 36 and prevents diaphragm 50 from achieving an "at rest" condition at the internal stop condition. The minimum volume of thermally responsive material 38 creates an internal hydraulic stop condition in which the diaphragm is partially deflected. This partial deflection maintains normally open contact 40 in a closed position. This is schematically illustrated in FIGS. 2 and 3.

Figure 8:
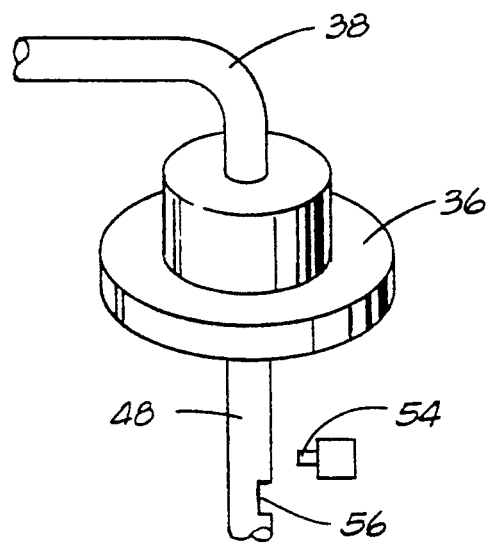
FIG. 8 is an illustration of an optional latching mechanism in normal operating mode.
Figure 9:
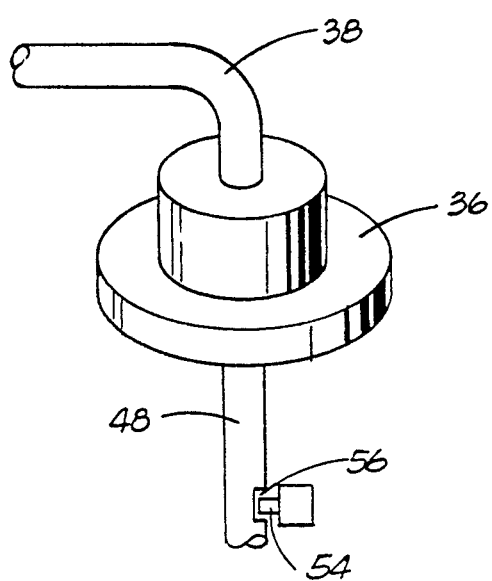
FIG. 9 is an illustration of an optional latching mechanism in locked out mode.

When the volume of thermally responsive material 38 is reduced below the prescribed minimum volume due to microscopic leaks or a fracture, diaphragm 50 further deflects to the "at rest" condition. This further deflection permits normally open contact 40 to open. Normally open contact 40 will also open when the ambient temperature surrounding bulb 30 is below the minimum calibration temperature. Oven applications normally have a minimum calibration temperature of approximately zero degrees Fahrenheit. Zero degrees Fahrenheit was chosen as an opening temperature since at this temperature, water lines, sinks and sanitary facilities are frozen and fractured. If the ambient temperature is below the minimum calibration temperature, normally open contact 40 will open and heating device 46 will be inoperative. If the ambient temperature surrounding bulb 30 is raised to a temperature above the minimum calibration temperature, normally open contact 40 will close and control device 10 will function. However, if thermally responsive material 38 has leaked a sufficient volume to result in an "at rest" condition, fail safe control device 10 will not allow the heating system to function. To prevent normally open contact 40 from closing once it has opened, control device 10 may be provided with a latching mechanism, as illustrated in FIGS. 8 and 9.

Normally closed contact 42 is connected in series with normally open contact 40. Thus, if either normally open contact 40 or normally closed contact 42 is open, the heating device will not function.

When microscopic leaks occur in the system, the volume of thermally responsive material 38 is reduced which results in the need for higher temperatures around nonelastic bulb 30 to obtain the same results in pressure responsive device 36. At the end of every complete heating cycle or operation of the system, the maximum flex of diaphragm 50 is slightly less due to the microscopic leak. Once the minimum volume of thermally responsive material 38 in pressure responsive device 36 is reduced below the minimum required, normally open contact 40 will open and remain open. If the closed system is ruptured such that there is an immediate loss of thermally responsive material 38, normally open contact 40 will open immediately.

In a typical hydraulic control system comprised of bulb 14, capillary 18 and operator 20 and filled with thermally responsive material 38, the inside diameter and length of bulb 14 along with the "start to move" temperature are designed to comply with the application specifications for deflection constant and control dial layout. To agree with the specification, the system is filled with the proper type and quantity of thermally responsive material 38 and bulb 14 is immersed in a bath of temperature controlled liquid with approximately an inch of the end of the bulb remaining above the liquid. Thermally responsive material 38 is allowed to contract into bulb 14 and the end of bulb 14 is sealed by crimping. In the standard hydraulic system used in typical control device 12, there is no guarantee that there is a "metal to metal" stop in hydraulic actuator 20 or that there is a guaranteed minimum film of thermally responsive material 38 between the metal surfaces of the hydraulic actuator because it is not deemed necessary as long as the standard hydraulic system satisfies "start to move" and application specifications.

In contrast with the standard system, fail safe control device 10 guarantees an hydraulic stop by lengthening bulb 30 slightly. After the hydraulic system is filled and sealed as described above, the additional volume of thermally responsive material 38 contained in lengthened bulb 30 is forced into pressure responsive device 36 by placing an additional precise crimp on the end of bulb 30.

In operation, normally closed contact 42 and normally open contact 40 are operated by changes in the volume of thermally responsive material 38 within pressure responsive device 36 due to changes in the temperature surrounding nonelastic bulb 30. Referring now to FIGS. 2 and 3, during normal operation, normally closed contact 42 opens at a specific volume related to a predetermined temperature. As the temperature decreases in oven 32 or other heating appliance, the volume of thermally responsive material 38 is reduced in pressure responsive device 36 resulting in normally closed contact 42 remaining closed, thereby permitting electrical current to pass through line 52 to heating element 46. The opening and closing of normally closed contact 42 thus controls heating element 46. The normally open contact 40 is held in a closed position by a minimum volume of thermally responsive material 38 contained in pressure responsive device 36.

Figure 4:
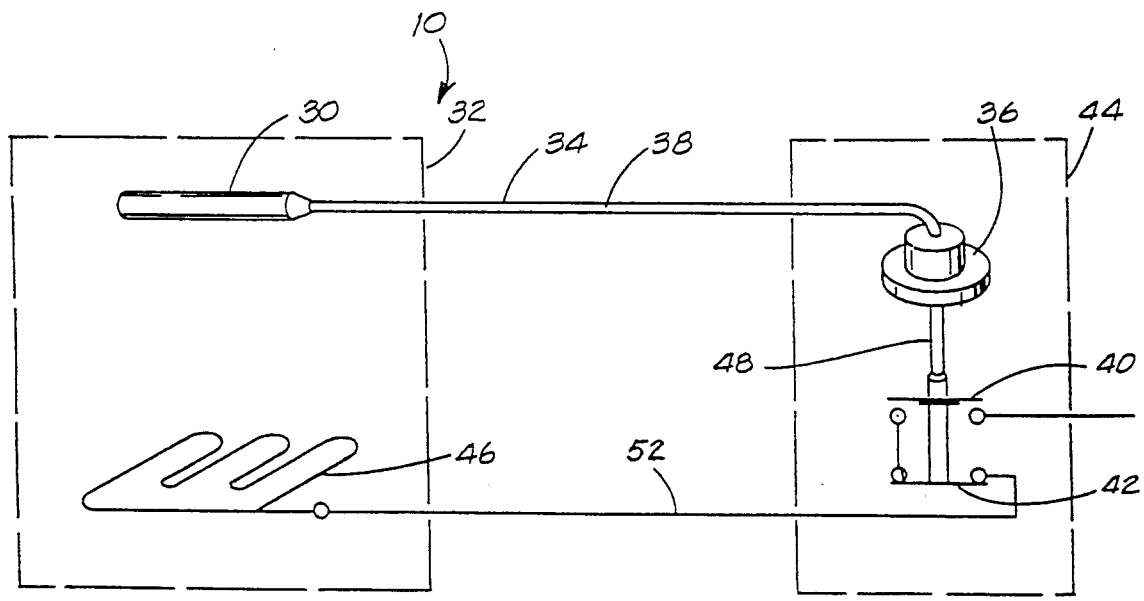
FIG. 4 is a schematic of the fail safe control device of the present invention showing the normally open switch in an open condition as when the thermally responsive fluid has escaped from the system.

Referring to FIG. 4, when the minimum volume is decreased below a preselected minimum volume due to microscopic leaks or fractures, normally open contact 40 will open producing an open circuit thus preventing actuation of heating element 46 and producing a fail safe condition in the system.

As a further protection, the fail safe control device of the instant invention can be provided with a latching mechanism which will make the system inoperative when conditions have caused the normally open contact to open. FIGS. 8 and 9 depict one method of accomplishing this. Using this option, actuator 56 is provided as a portion of linkage 48. Latch 54 is positioned so it bears on linkage 48. When linkage 48 is in the normal operating position, as illustrated in FIGS. 2, 3, 5 and 7, latch 54 is not engaged and linkage 48 moves freely in response to movement of pressure responsive device 36. This condition is illustrated in FIG. 8.

When a sufficient amount of thermally responsive material has been lost causing contact 40 to open (as shown in FIG. 4), latch 54 will engage actuator 56, as shown in FIG. 9. Thus, control device 10 will be latched open and the heating device will be inoperative.

Figure 10:
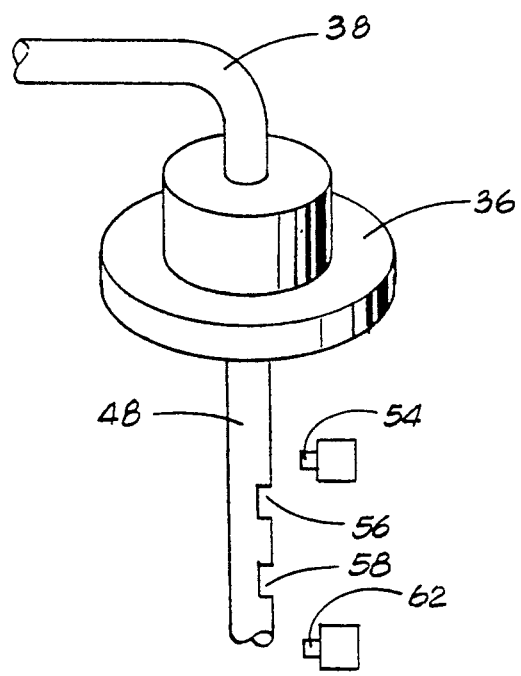
FIG. 10 is an illustration of another optional version having the capability of locking out under two separate operating conditions.

Under some circumstances, normally closed contact 42 will not open even when thermally responsive device 36 and linkage 48 operate properly. This can also cause a dangerous overheat condition. To prevent this condition, linkage 48 may be provided with a second actuator 58 and a second latch 62. When linkage 48 moves further than desired, actuator 58 will engage latch 62 (FIG. 10). Latch 62 will then prevent additional movement of linkage 48 through an appropriate linkage (not shown) and will cause contact 40 to open, thus cutting off heat to the device and preventing a hazardous condition. Under some circumstances, a single latch 54 can be used to interact with both actuator 56 and 58 and provide both leakage protection and high temperature overrun protection.

In view of the above, it will be seen that the objects of the invention are achieved and other advantageous results are obtained. As various changes can be made in the above constructions without departing from the scope of the invention, it is intended that all matter contained in the above descriptions or shown in the accompanying drawings shall be interpreted as illustrative and not in a limiting sense.

What is claimed is:

1. A fail safe control device consisting of a nonelastic container adapted to be subjected to temperature changes; a capillary tube connected to said container; a single pressure responsive device connected to said capillary tube and said nonelastic container, said capillary tube and said pressure responsive device forming a closed system; a thermally responsive material filling said closed system; a control device operated by said pressure responsive device, said control device containing a normally closed contact and normally open contact, said normally closed contact being a primary operator of a secondary device; and a predetermined minimum volume of thermally responsive material maintaining said pressure responsive device in a partially deflected condition so as to maintain said normally open contact in a closed position, said normally open contact opening upon movement of said pressure responsive device to an "at rest" condition which occurs upon loss of said minimum volume of said thermally responsive material, such that when said normally open contact opens, said secondary device is rendered inoperative.

2. A fail safe control device according to claim 1 wherein said secondary device comprises an electrical heating element and said normally open contact and normally closed contact control the flow of electrical current to said heating element.

3. A fail safe control device according to claim 1 wherein said secondary device comprises an electrically controlled gas burner and said normally open contact and normally closed contact control electrically operated valves.

4. A fail safe control device according to claim 1 wherein said secondary device is a burner, said normally open contact controlling a safety valve such that when said normally open contact is in the open position, movement of fluid through said safety valve is terminated; and said normally closed contact controlling a main control valve such that when in the closed position, the burner is in operation and when in the open position, the flow of fluid through said main control valve is terminated.

5. A fail safe control device according to claim 1 wherein said control device comprises pneumatic controls.

6. A fail safe control device according to claim 1 wherein said control device comprises hydraulic controls.

7. A fail safe control device according to claim 1 wherein said device is provided with a latching device, said latching device rendering said pressure responsive device inoperative when said pressure responsive device moves to the "at rest" condition.

8. A fail safe control device according to claim 1 wherein said device is provided with a latching device which renders said pressure responsive device inoperative and opens said normally open contact when the temperature to which said nonelastic container is subjected exceeds a predetermined value.

9. A fail safe control device comprising a nonelastic container adapted to be subjected to temperature changes, said nonelastic container being an elongated bulb contained within an area to be heated; a capillary tube connected at a first end to said nonelastic container, said capillary tube consisting of nonelastic tubing extending from said nonelastic container and from said heated area; a single pressure responsive device connected to a second end of said capillary tube, said second end being outside of the heated area; said nonelastic container, said capillary tube and said pressure responsive device forming a closed system; a thermally responsive material filling said closed system and partially expanding said pressure responsive device, said thermally responsive material having the characteristic of reproducible changes in volume when heated or cooled; and a control device operated by said pressure responsive device containing a normally closed contact and a normally open contact, said control device operating a secondary device, said normally open contact and said normally closed contact being operated by changes in volume of said thermally responsive material within said pressure responsive device due to changes in temperature surrounding said nonelastic container, said normally closed contact being opened at a specific volume, said specific volume relating to a predetermined temperature, the opening and closing of said normally closed contact controlling said secondary device, said normally open contact being maintained in a closed position by the partial deflection of said pressure responsive device, which partial deflection is produced by a predetermined minimum volume of thermally responsive material in said pressure responsive device, and said normally open contact being permitted to open when the volume of thermally responsive material within the pressure responsive device falls below the predetermined minimum volume thereby allowing said pressure responsive device to move to an "at rest" condition and rendering said secondary device safe.

10. A fail safe control device according to claim 9 wherein said device is provided with a latching device, said latching device rendering said pressure responsive device inoperative when said pressure responsive device moves to the "at rest" condition.

11. A fail safe control device according to claim 9 wherein said device is provided with a latching device which renders said pressure responsive device inoperative and opens said normally open contact when the temperature to which said nonelastic container is subjected exceeds a predetermined value.

12. A method of providing a fail safe control device comprising the following steps: (1) adapting a nonelastic container to be subjected to temperatures, (2) connecting a capillary tube to said container, (3) connecting a single pressure responsive device to said capillary tube, such that said nonelastic container, said capillary tube, and said pressure responsive device form a closed system, (4) filling said closed system with a thermally responsive material, (5) operating a secondary device with said control device wherein a normally closed contact is the primary operator of said secondary device; and (6) maintaining a minimum volume of said thermally responsive material within said pressure responsive device, said minimum volume being sufficient to partially actuate said pressure responsive device, said partial deflection being sufficient to maintain said normally open contact in the closed position, said normally open contact opening when said pressure responsive device moves to an "at rest" condition which occurs upon loss of said minimum volume of said thermally responsive material such that when said normally open contact opens, said secondary device is rendered inoperative.

13. A fail safe control device according to claim 12 wherein said device is provided with a latching device, said latching device rendering said pressure responsive device inoperative when said pressure responsive device moves to the "at rest" condition.

14. A fail safe control device according to claim 12 wherein said device is provided with a latching device which renders said pressure responsive device inoperative and opens said normally open contact when the temperature to which said nonelastic container is subjected exceeds a predetermined value.

* * * * *